(12) United States Patent
Kim et al.

(10) Patent No.: US 9,311,957 B2
(45) Date of Patent: Apr. 12, 2016

(54) MULTI-CHANNEL AUDIO SIGNAL CONVERTING DEVICE USING TIME-VARYING DIGITAL FILTER, ELECTRONIC SYSTEM INCLUDING THE SAME, AND METHOD OF CONVERTING MULTI-CHANNEL AUDIO SIGNAL

(71) Applicants: Bong Joo Kim, Seoul (KR); Seung Bin You, Seongnam-si (KR); Myung-Jin Lee, Suwon-si (KR); Sung-No Lee, Ansan-si (KR); Yong Hee Lee, Yongin-si (KR); Moo Yeol Choi, Yongin-si (KR)

(72) Inventors: Bong Joo Kim, Seoul (KR); Seung Bin You, Seongnam-si (KR); Myung-Jin Lee, Suwon-si (KR); Sung-No Lee, Ansan-si (KR); Yong Hee Lee, Yongin-si (KR); Moo Yeol Choi, Yongin-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 436 days.

(21) Appl. No.: 13/755,225

(22) Filed: Jan. 31, 2013

(65) Prior Publication Data

US 2013/0194497 A1 Aug. 1, 2013

(30) Foreign Application Priority Data

Jan. 31, 2012 (KR) ........................ 10-2012-0010083

(51) Int. Cl.
*G06F 17/00* (2006.01)
*G11B 20/10* (2006.01)
*H04N 5/04* (2006.01)
*H04N 5/60* (2006.01)

(52) U.S. Cl.
CPC ............ *G11B 20/10037* (2013.01); *H04N 5/04* (2013.01); *H04N 5/607* (2013.01)

(58) Field of Classification Search
CPC ............... H03H 17/0628; G11B 20/10; G11B 20/10037; H04N 21/4305; H04N 21/4307; H04N 21/04
See application file for complete search history.

(56) References Cited

U.S. PATENT DOCUMENTS

| 7,408,485 | B1 | 8/2008 | Yu et al. |
| 2005/0062622 | A1 | 3/2005 | Miller et al. |
| 2006/0153323 | A1* | 7/2006 | Kataoka et al. ............... 375/354 |
| 2009/0128698 | A1 | 5/2009 | Okajima et al. |
| 2011/0054913 | A1 | 3/2011 | Yu et al. |

FOREIGN PATENT DOCUMENTS

KR 10-0633568 6/2004

* cited by examiner

*Primary Examiner* — Andrew C Flanders
(74) *Attorney, Agent, or Firm* — Muir Patent Law, PLLC

(57) ABSTRACT

A multi-channel audio signal converting device using a time-varying digital filter, an electronic system including the same, and a method of converting an audio signal using the time-varying digital filter are provided. The multi-channel audio signal converting device includes a first signal channel and a second signal channel configured to perform analog-to-digital conversion or digital-to-analog conversion using a first clock signal; and a first time-varying filter configured to synchronize a digital audio signal synchronized with a second clock signal different from the first clock signal with the first clock signal and to input the digital audio signal to the second signal channel when digital-to-analog conversion is performed or to synchronize an output signal of the second signal channel with the second clock signal when analog-to-digital conversion is performed.

22 Claims, 19 Drawing Sheets

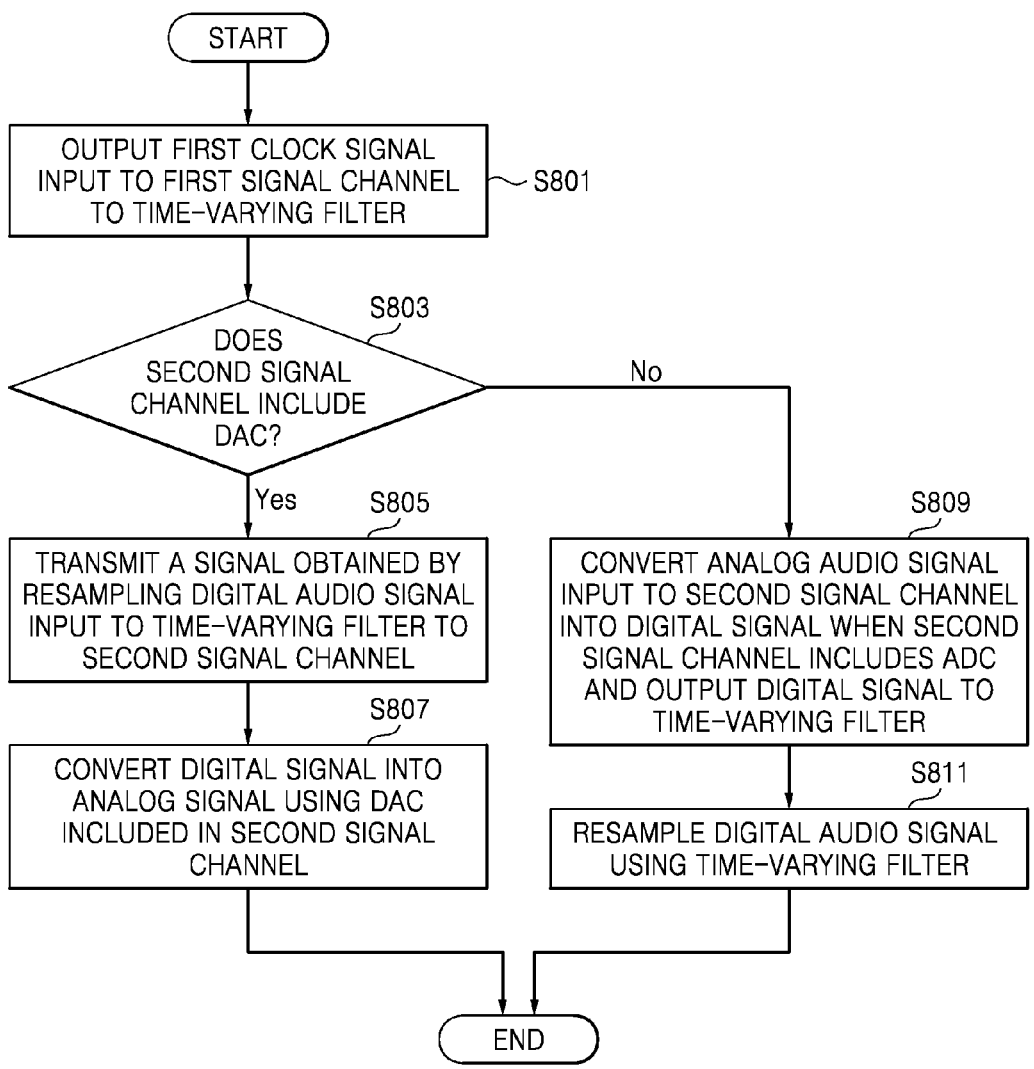

MULTI-CHANNEL AUDIO SIGNAL CONVERTING DEVICE USING TIME-VARYING DIGITAL FILTER, ELECTRONIC SYSTEM INCLUDING THE SAME, AND METHOD OF CONVERTING MULTI-CHANNEL AUDIO SIGNAL

CROSS-REFERENCE TO RELATED APPLICATIONS

This application claims priority under 35 U.S.C. §119(a) to Korean Patent Application No. 10-2012-0010083 filed on Jan. 31, 2012, the disclosure of which is hereby incorporated by reference in its entirety.

BACKGROUND

Digital television (DTV) is a TV broadcasting system that processes a digital signal of 0 and 1 in all broadcasting stages such as production, edition, transmission, and reception, in contrast to an analog television that processes different signals according to the type of information. Conventional TV uses an analog method by which a signal is sequentially processed over time, thereby having a limit to providing sharp and clear pictures and sound and being limited in the number of channels.

A digital television receives video and audio signals from various external sources such as DVD players, personal computers (PCs), set-top boxes (STBs), and over-the-air broadcasting. In particular, DTV can receive both analog audio signals and digital audio signals at the same time.

A DTV system typically receives multiple audio signals over different channels (herein referred to as multi-channel audio signals) for which clock signals are not synchronized with each other. When a multi-channel audio analog-to-digital converter and a multi-channel audio digital-to-analog converter whose clock signals are not synchronized with each other are integrated into a single semiconductor chip, severe noise can occur in an audio signal band due to mutual interference between the clock signals.

When a multi-channel audio signal converting device is used, each channel typically has an asynchronous clock signal compared to the other channels, causing unwanted noise. Accordingly, when a multi-channel audio signal converter is used, the quality of signals may deteriorate.

SUMMARY

Embodiments of the present disclosure relate to a multi-channel audio signal converting device using a time-varying digital filter, digital television including the same, and a method of converting an audio signal using the time-varying digital filter, and more particularly, to an audio signal converting device for increasing the performance of a multi-channel audio signal converter using a time-varying digital filter, digital television including the same, and a method of converting a multi-channel audio signal using the time-varying digital filter.

According to some embodiments a method of converting an audio signal includes performing at least one of analog-to-digital conversion and digital-to-analog conversion using a first clock signal in a first signal channel; synchronizing a digital audio signal synchronized with a second clock signal different from the first clock signal with the first clock signal and inputting the digital audio signal to a second signal channel; and receiving the digital audio signal and performing digital-to-analog conversion using the first clock signal in the second signal channel The synchronizing may include inputting the first clock signal to a time-varying filter, synchronizing a digital audio signal, which is input to the time-varying filter in synchronization with the second clock signal, with the first clock signal, and outputting the digital audio signal synchronized with the first clock signal to the second signal channel including a digital-to-analog converter.

The performing the conversion may include converting the digital audio signal input to the second signal channel into an analog audio signal using the first clock signal.

The synchronizing may further include calculating an average sampling frequency for each of the digital audio signal input to the time-varying filter and a digital audio signal output from the time-varying filter based on the first clock signal.

The synchronizing may further include accumulating the average sampling frequency for a predetermined period of time.

The synchronizing may further include detecting a sampling time or phase difference between the digital audio signal input to the time-varying filter and the digital audio signal output from the time-varying filter based on the accumulated average sampling frequency.

The synchronizing may further include controlling a flow of the digital audio signal input to the time-varying filter based on the sampling time or phase difference.

The synchronizing may further include generating a filter coefficient for the time-varying filter based on the sampling time or phase difference.

The synchronizing may further include interpolating the digital audio signal input to the time-varying filter using the filter coefficient.

The interpolating may be performed for each of samples forming the digital audio signal input to the time-varying filter.

The generating the filter coefficient may include measuring a sampling time of each of the samples forming the digital audio signal input to the time-varying filter and generating a filter coefficient for each sample.

The digital audio signal input to the second signal channel may be a result of resampling the digital audio signal input to the time-varying filter based on the first clock signal.

When there are a plurality of time-varying filters, digital audio signals respectively input to the time-varying filters based on different clock signals, respectively, may be synchronized with the first clock signal.

When there are a plurality of time-varying filters, the time-varying filters may respectively resample digital audio signals, which are respectively received from different channels other than the first signal channel, based on different clock signals, respectively.

The time-varying filters may respectively receive the digital audio signals respectively based on clock signals different from the first clock signal and synchronize the digital audio signals with the first clock signal.

According to other embodiments, there is provided a multi-channel audio signal converting device including a first signal channel configured to perform at least one of analog-to-digital conversion and digital-to-analog conversion using a first clock signal; a first time-varying filter configured to synchronize a digital audio signal synchronized with a second clock signal different from the first clock signal with the first clock signal and to output the digital audio signal to the second signal channel; and a second signal channel configured to receive the digital audio signal from the first time-varying filter and perform digital-to-analog conversion using the first clock signal The time-varying filter may include a frequency detector configured to calculate an average sampling frequency for each of the digital audio signal input to the first time-varying filter and a digital audio signal output from the first time-varying filter based on a reference clock signal.

The frequency detector may accumulate the average sampling frequency for a predetermined period of time and detect a sampling time or phase difference between the digital audio signal input to the first time-varying filter and the digital audio signal output from the first time-varying filter based on the accumulated average sampling frequency.

The time-varying filter may further include a data buffer configured to temporarily store the digital audio signal input to the first time-varying filter and a data buffer controller configured to control an amount of a digital audio signal output from the data buffer based on the sampling time or phase difference.

The time-varying filter may further include a coefficient generator configured to generate a filter coefficient based on the sampling time or phase difference.

The coefficient generator may generate a filter coefficient for each of a plurality of samples forming the digital audio signal input to the time-varying filter based on a sampling time of each sample.

The time-varying filter may further include an interpolation filter configure to interpolate the digital audio signal input to the time-varying filter using the filter coefficient generated by the coefficient generator.

The second signal channel may include a digital-to-analog converter configured to receive the digital audio signal from the time-varying filter and convert it into an analog audio signal.

When there are a plurality of time-varying filters, the time-varying filters may receive different clock signals, respectively, different digital audio signals, respectively, and the first clock signal and may synchronize the digital audio signals, respectively, with the first clock signal.

When there are a plurality of time-varying filters, the time-varying filters may receive different clock signals, respectively, different digital audio signals synchronized with the first clock signal, respectively, and the first clock signal and may synchronize the respective digital audio signals with the respective different clock signals.

According to another embodiment, method of converting an audio signal includes performing at least one of analog-to-digital conversion and digital-to-analog conversion using a first clock signal in a first signal channel; performing analog-to-digital conversion using the first clock signal in a second signal channel; and synchronizing an output signal of the second signal channel with the second clock signal different from the first clock signal.

The signal channels may be implemented into a single chip.

According to further embodiments, there is provided an electronic system including a central processing unit (CPU), the above-described multi-channel audio signal converting device configured to process at least two audio signals according to control of the CPU, and an output unit configured to output an audio signal output from the multi-channel audio signal converting device.

The electronic system may further include a tuner configured to acquire a broadcast signal and to generate a single-ended sound intermediate frequency signal or differential television broadcast signals.

The CPU and the multi-channel audio signal converting device may be implemented into a single system on chip (SOC).

The electronic system may further include a radio frequency transceiver configured to convert a radio signal received through an antenna into a signal that can be processed by the SOC.

The electronic system may be a mobile phone, a smart phone, a tablet personal computer, a personal digital assistant, a portable electronic device, or a digital television system.

According to other embodiments, there is provided a SOC including a CPU and the above-described multi-channel audio signal converting device integrated into a single chip together with the CPU to process at least two audio signals.

BRIEF DESCRIPTION OF THE DRAWINGS

The above and other features and advantages will become more apparent by describing in detail exemplary embodiments thereof with reference to the attached drawings in which:

FIG. 8 is a flowchart of an exemplary method of converting an audio signal according to other embodiments;

DETAILED DESCRIPTION

Figure 1A:
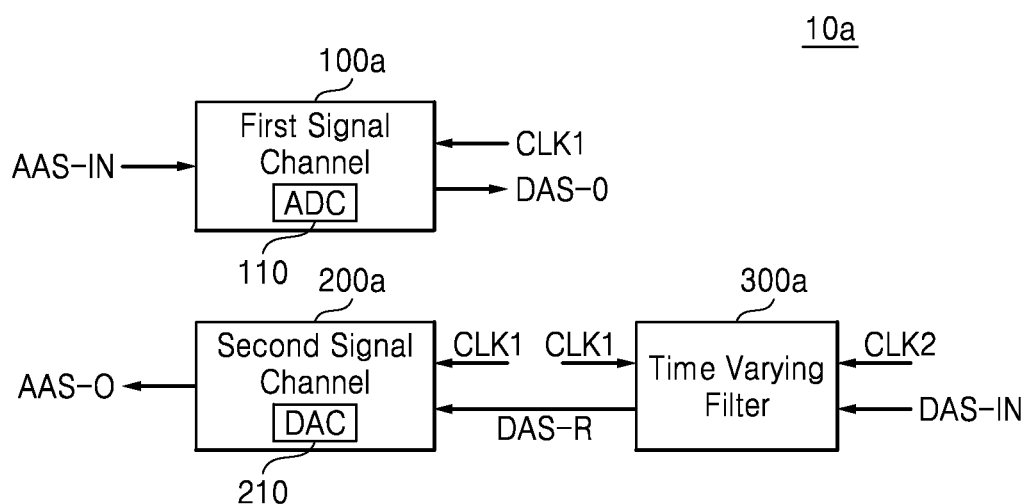
FIGS. 1A through 1D are schematic diagrams of exemplary multi-channel audio signal converting devices according to some embodiments.

The present disclosure now will be described more fully with reference to the accompanying drawings, in which various embodiments are shown. This invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIGS. 1A through 1D are schematic diagrams of exemplary multi-channel audio signal converting devices 10a, 10b, 10c, and 10d according to some embodiments. As shown in FIGS. 1A through 1D, each of the multi-channel audio signal converting devices 10a, 10b, 10c, and 10d includes a first signal channel 100a or 100b, a second signal channel 200a or 200b, and a time-varying filter 300a or 300b. The first signal channels and second signal channels may be different audio channels that receive different audio signals, for example, generated from different respective audio sources (e.g., one may receive an audio signal from a broadcast receiver, such as a cable box, and another may receive an audio signal from a DVD player or a personal computer). As such, the multiple channels (i.e., multi-channels) described herein as being input to the multi-channel audio signal converting devices typically refers to a channel that receives a signal from an independent source, such as a DVD player, personal computer, set-top box, etc. The channel may be part of a multi-channel audio system that includes a multi-channel audio signal converting device.

For simplicity, FIGS. 1A through 1D and FIGS. 2A and 2B show analog signals on the left, and digital signals on the right. Inputs to the signal converting devices are labeled as IN, IN1, IN2, or IN3 regardless of whether they are shown on the left or right in the drawing or whether they are digital or analog. Similarly, outputs from the signal converting devices are labeled as O, O1, O2, O3, or OR regardless of whether they are shown on the left or right in the drawing or whether they are digital or analog.

The first signal channel 100a or 100b and the second signal channel 200a or 200b may include a digital-to-analog converter (DAC) 210 or an analog-to-digital converter (ADC) 110. Each of the signal channels 100a, 100b, 200a, and 200b may be one of different types of audio channels, for example, a stereo channel, a surround-sound channel, or a mono channel. Exemplary structures of the signal channels 100a, 100b, 200a, and 200b will be described further with reference to FIGS. 5A and 5B later.

FIG. 1A illustrates an exemplary 2-channel audio signal converting device 10a according to some embodiments. When the first signal channel 100a includes the ADC 110 and the second signal channel 200a includes the DAC 210, the first signal channel 100a may receive an analog audio signal (i.e., analog audio signal input) AAS-IN and a first clock signal CLK1 and output a digital audio signal (i.e., digital audio signal output) DAS-O. For example, the first signal channel 100a may receive an analog audio signal from a source such as an analog receiver (e.g., an analog TV receiver). The analog audio signal may be sampled using a sampling rate of clock signal CLK1 in order to convert it to a digital audio signal.

The second signal channel 200a is connected to the time-varying filter 300a. The time-varying filter 300a receives a digital audio signal (i.e., digital audio signal input) DAS-IN to be input to the second signal channel 200a, the first clock signal CLK1 and a second clock signal CLK2. For example, the digital audio signal DAS-IN may be a signal received from a source such as a personal computer. The personal computer may have sampled the digital audio signal DAS-IN using a clock sampling rate of second clock signal CLK2. The time-varying filter 300a may synchronize digital audio signal (i.e., digital audio signal-resampled) DAS-R, which has been generated through sampling based on the second clock signal CLK2, with the first clock signal CLK1. The digital audio signal DAS-R that has been subjected to resampling through the synchronization with the first clock signal CLK1 may be input to the second signal channel 200a and converted into an analog audio signal (i.e., analog audio signal output) AAS-O by the DAC 210 included in the second signal channel 200a. At this time, the DAC 210 of the second signal channel 200a converts the digital audio signal DAS-R into the analog audio signal AAS-O using the first clock signal CLK1. In the above example, the same first clock signal CLK1 is input into each of the first signal channel 100a, the second signal channel 200a, and the time varying filter 300a. A different second clock signal CLK2 is input into the time varying filter 300b.

Figure 1B:
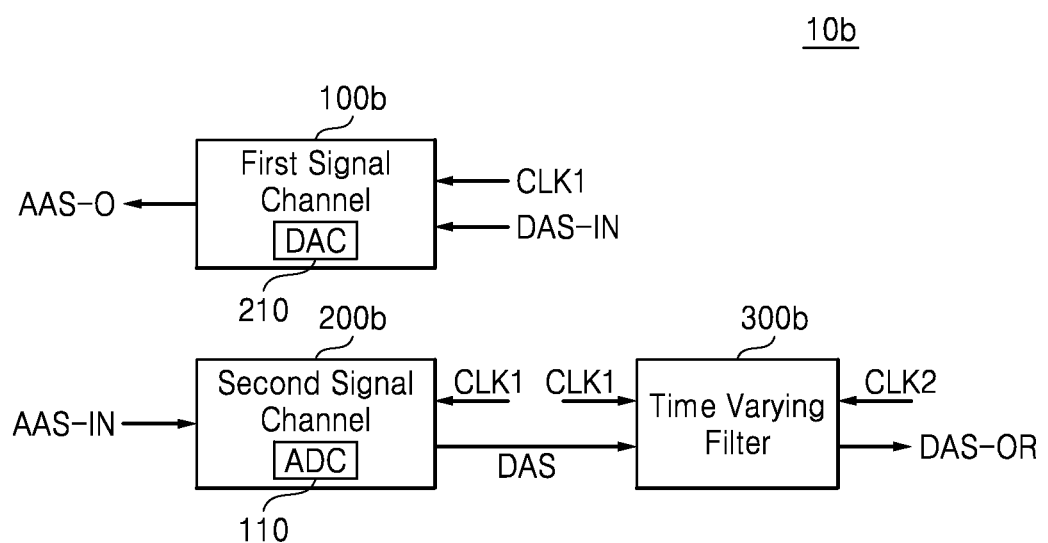

FIG. 1B illustrates an exemplary 2-channel audio signal converting device 10b according to other embodiments. When the first signal channel 100b includes the DAC 210 and the second signal channel 200b includes the ADC 110, the first signal channel 100b may receive the digital audio signal DAS-IN and the first clock signal CLK1 and output the analog audio signal AAS-O.

The second signal channel 200b is connected to the time-varying filter 300b. The second signal channel 200b may receive the analog audio signal AAS-IN and convert it into a first digital audio signal DAS using the first clock signal CLK1.

The time-varying filter 300b receives the first digital audio signal DAS output from the second signal channel 200b, the first clock signal CLK1, and the second clock signal CLK2. The time-varying filter 300b may synchronize the first digital audio signal DAS, which has been generated by the sampling based on the first clock signal CLK1, with the second clock signal CLK2. The first digital audio signal DAS received from the second signal channel 200b is subjected to resampling through the synchronization with the second clock signal CLK2, and is output as a second digital audio signal DAS-OR. In this example, the same first clock signal CLK1 is input into each of the first signal channel 100b, the second signal channel 200b, and the time varying filter 300b. A different second clock signal CLK2 is input into the time varying filter 300b.

Figure 1C:
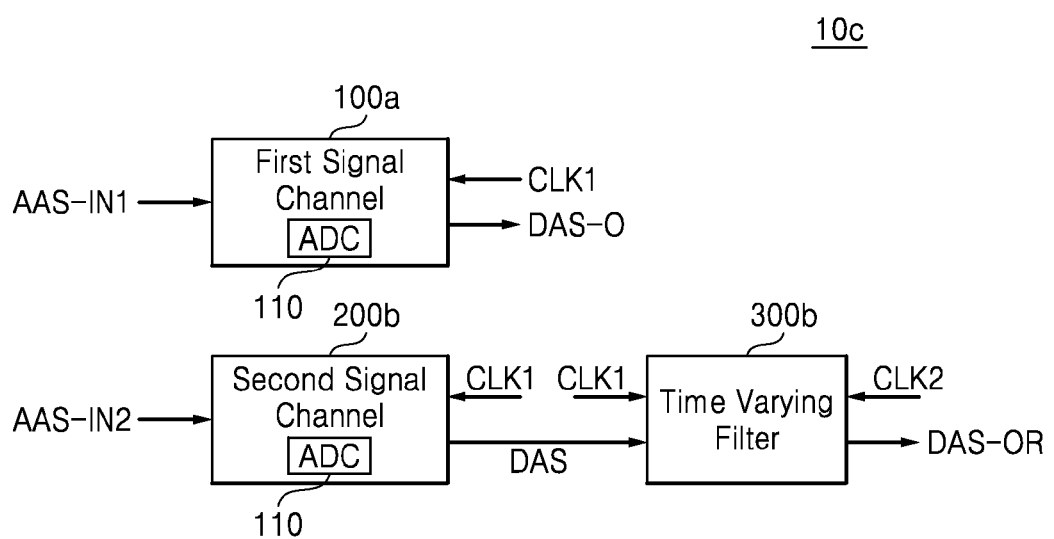

FIG. 1C illustrates an exemplary 2-channel audio signal converting device 10c according to further embodiments. When the first signal channel 100a and the second signal channel 200b include the ADC 110, the first signal channel 100a may receive an analog audio signal AAS-IN1 and the first clock signal CLK1 and output the digital audio signal DAS-O.

The second signal channel 200b is connected to the time-varying filter 300b. The second signal channel 200b may receive an analog audio signal AAS-IN2 and convert it into a first digital audio signal DAS using the first clock signal CLK1.

The time-varying filter 300b receives the first digital audio signal DAS output from the second signal channel 200b, the first clock signal CLK1, and the second clock signal CLK2. The time-varying filter 300b may synchronize the first digital audio signal DAS, which has been generated by the sampling based on the first clock signal CLK1, with the second clock signal CLK2. The first digital audio signal DAS received from the second signal channel 200b is subjected to resampling through the synchronization with the second clock signal CLK2, and is output as a second digital audio signal DAS-OR. In this example, the same first clock signal CLK1 is input into each of the first signal channel 100a, the second signal channel 200b, and the time varying filter 300b. A different second clock signal CLK2 is input into the time varying filter 300b.

Figure 1D:
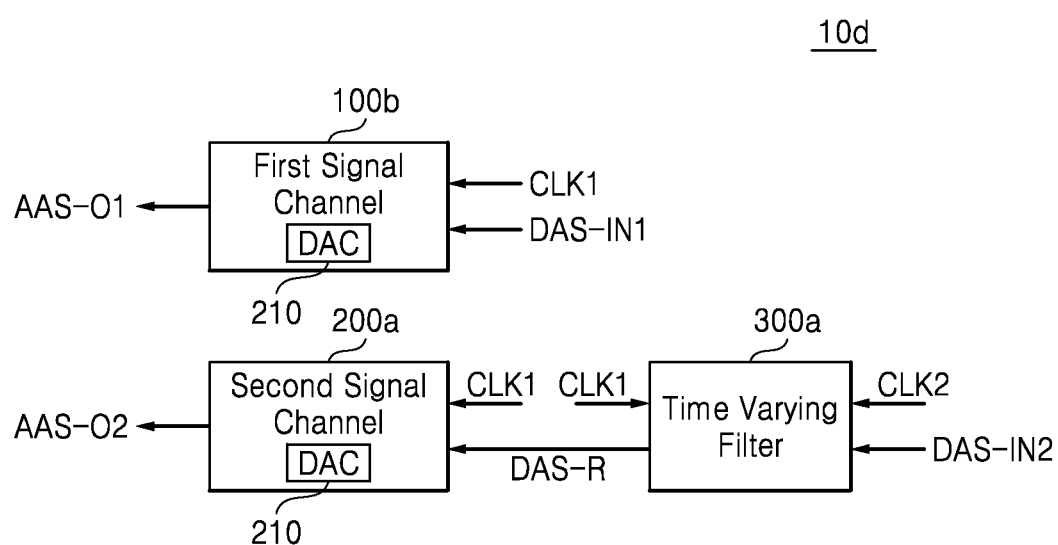

FIG. 1D illustrates an exemplary 2-channel audio signal converting device 10d according to other embodiments. When the first signal channel 100b and the second signal channel 200a include the DAC 210, the first signal channel 100b may receive a digital audio signal DAS-IN1 and the first clock signal CLK1 and output an analog audio signal AAS-O1.

The second signal channel 200a is connected to the time-varying filter 300a. The time-varying filter 300a receives a digital audio signal DAS-IN2 to be input to the second signal channel 200a, the first clock signal CLK1 and a second clock signal CLK2. The time-varying filter 300a may synchronize the digital audio signal DAS-IN2, which has been generated through sampling based on the second clock signal CLK2, with the first clock signal CLK1. The digital audio signal DAS-R that has been subjected to resampling through the synchronization with the first clock signal CLK1 may be input to the second signal channel 200a and converted into an analog audio signal AAS-O2 by the DAC 210 included in the second signal channel 200a in synchronization with the first clock signal CLK1. In this example, the same first clock signal CLK1 is input into each of the first signal channel 100b, the second signal channel 200a, and the time varying filter 300a. A different second clock signal CLK2 is input into the time varying filter 300a.

The four examples shown in FIGS. 1A through 1D show different examples where two signal channels receiving a synchronized clock are either both input channels, both output channels, or one input channel and one output channel.

FIGS. 1A through 1D also show different examples where two signal channels receiving a synchronized clock are either both ADC channels, both DAC channels, or one ADC channel and one DAC channel.

Figure 2A:
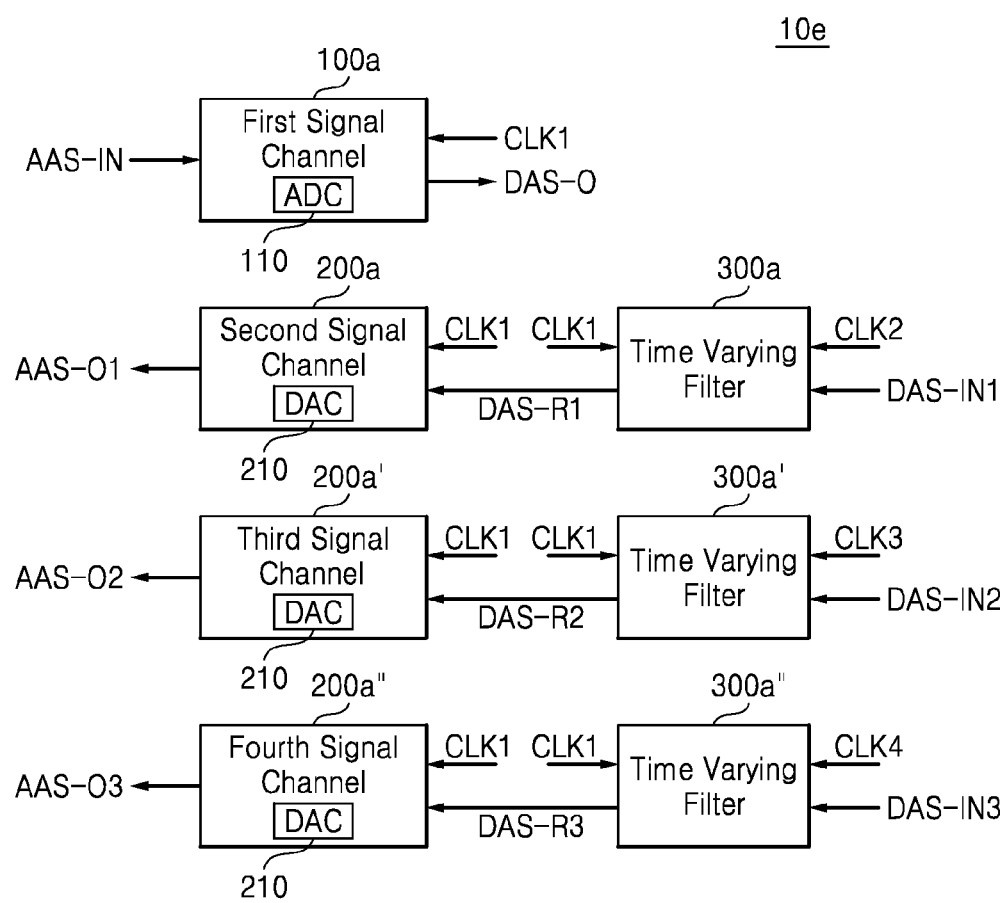
FIGS. 2A and 2B are schematic diagrams of exemplary multi-channel audio signal converting devices according to other embodiments.
Figure 2B:
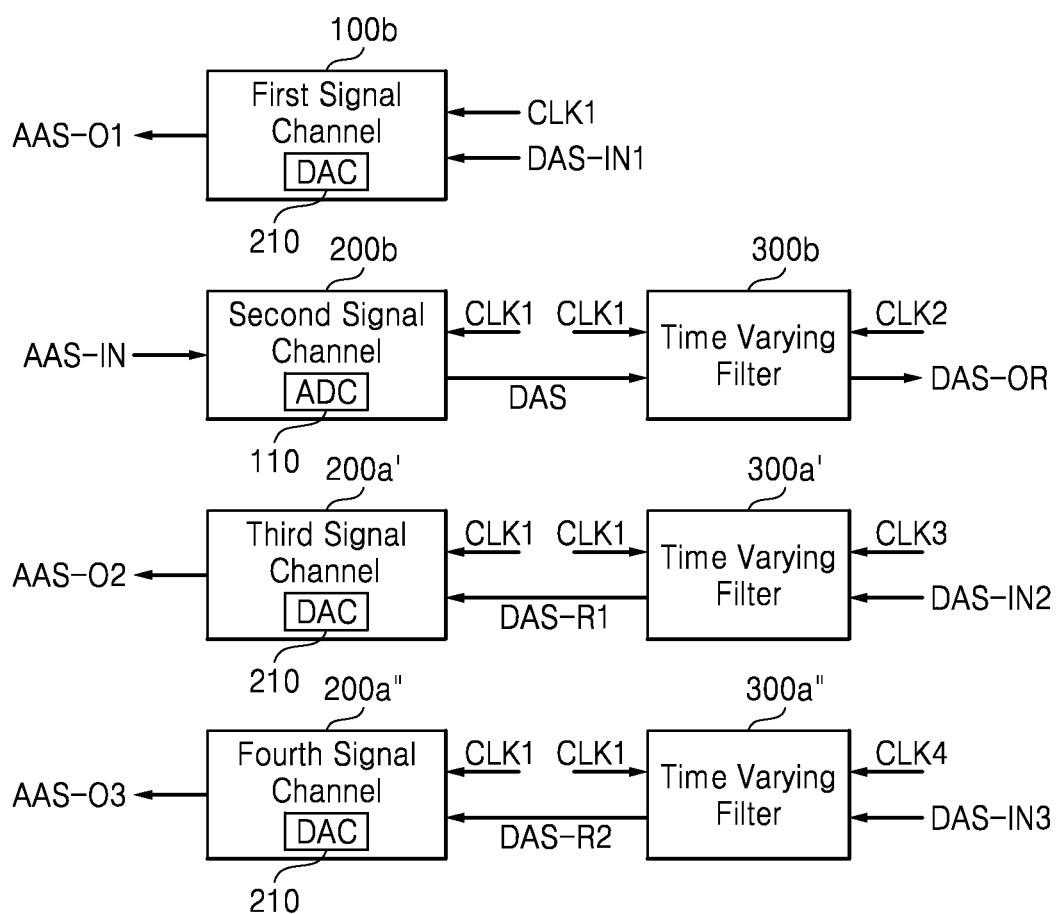

FIGS. 2A and 2B are schematic diagrams of exemplary multi-channel audio signal converting devices 10e and 10f according to yet other embodiments. The multi-channel audio signal converting devices 10e and 10f have four channels.

In one embodiment, digital inputs and outputs DAS-O, DAS-IN1, DAS-IN2, and DAS-IN3 of signal channels are intended to have the same sampling rate. However, the digital inputs are output from physically different sources and thus typically have slightly different sampling rates. For instance, a plurality of audio signals received by a digital television (DTV) system may have been sampled in various sources such as different portable audio devices, a broadcasting system (e.g., set-top box) or a DVD player. Accordingly, the frequency of the audio signals sampled (or generated) in, for example, a broadcasting system and input to the multi-channel audio signal converting device may be different from that of audio signals sampled in, for example, a DVD player and input to the multi-channel audio signal converting device, (e.g., because an oscillator in the broadcasting system and an oscillator in the DVD player are not the same physically) although both of them have been designed to have same frequency (e.g, 12.288 Mhz). Thus, as one example, the frequency of the audio signal sampled (or generated) in the broadcasting system and input to the multi-channel audio signal converting device may be 12.287 Mhz, which is slightly different from 12.288 Mhz, and the frequency of the audio signal sampled in the DVD player and input to the multi-channel audio signal converting device may be 12.289 Mhz, also slightly different from 12.288 Mhz.

For instance, when the first clock signal frequency of a digital audio signal processed in the multi-channel audio signal converting devices 10e and 10f is 12.288 MHz and the clock signal frequencies of the digital audio signals DAS-IN1, DAS-IN2, and DAS-IN3 respectively input from different sources to second through fourth signal channels 200a, 200a', and 200a" are 12.289 MHz, 12.287 MHz, and 12.286 MHz, interference occurs in each signal channel due to a frequency difference of 0.001 MHz.

For instance, exemplary frequencies of signals and corresponding clocks in the multi-channel audio signal converting device 10e illustrated in FIG. 2A may be as Table 1.

TABLE 1

| Signal | Clock | Exemplary frequency |
| --- | --- | --- |
| DAS-O | CLK1 | 12.288 MHz |
| DAS-IN1 | CLK2 | 12.289 MHz |
| DAS-IN2 | CLK3 | 12.287 MHz |
| DAS-IN3 | CLK4 | 12.286 MHz |
| DAS-R1 | CLK1 | 12.288 MHz |
| DAS-R2 | CLK1 | 12.288 MHz |
| DAS-R3 | CLK1 | 12.288 MHz |

The multi-channel audio signal converting devices 10e and 10f may synchronize a digital audio signal that has been sampled using the second clock signal CLK2, a third clock signal CLK3, or a fourth clock signal CLK4 with the frequency of the first clock signal CLK1 using a time-varying filter 300a, 300a', or 300a", respectively.

The second through fourth signal channels 200a, 200a', and 200a" are connected to the time-varying filters 300a, 300a', and 300a", respectively. The time-varying filters 300a, 300a', and 300a" receive the digital audio signals DAS-IN1, DAS-IN2, and DAS-IN3, respectively, to be input to the signal channels 200a, 200a', and 200a", respectively, and the first clock signal CLK1. In addition, the time-varying filters 300a, 300a', and 300a" receive the second clock signal CLK2, the third clock signal CLK3, and the fourth clock signal CLK4, respectively.

The multi-channel audio signal converting device 10e illustrated in FIG. 2A includes the first through fourth signal channels 100a, 200a, 200a', and 200a" and the time-varying filters 300a, 300a', and 300a" respectively corresponding to the second through fourth signal channels 200a, 200a', and 200a".

When the first signal channel 100a includes the ADC 110 and the second through fourth signal channels 200a, 200a', and 200a" include the DAC 210, the first signal channel 100a may receive the analog audio signal AAS-IN and the first clock signal CLK1 and output the digital audio signal DAS-O.

The first time-varying filter 300a may synchronize the first digital audio signal DAS-IN1 generated through sampling based on the second clock signal CLK2 with the first clock signal CLK1. A second digital audio signal DAS-R1 generated through resampling in synchronization with the first clock signal CLK1 may be input to the second signal channel 200a and then converted into an analog audio signal AAS-O1 by the DAC 210 included in the second signal channel 200a.

The second time-varying filter 300a' may synchronize the third digital audio signal DAS-IN2 generated through sampling based on the third clock signal CLK3 with the first clock signal CLK1. A fourth digital audio signal DAS-R2 generated through resampling in synchronization with the first clock signal CLK1 may be input to the third signal channel 200a' and then converted into an analog audio signal AAS-O2 by the DAC 210 included in the third signal channel 200a'.

The third time-varying filter 300a" may synchronize the fifth digital audio signal DAS-IN3 generated through sampling based on the fourth clock signal CLK4 with the first clock signal CLK1. A sixth digital audio signal DAS-R3 generated through resampling in synchronization with the first clock signal CLK1 may be input to the fourth signal channel 200a" and then converted into an analog audio signal AAS-O3 by the DAC 210 included in the fourth signal channel 200a".

In this example, the same first clock signal CLK1 is input into each of the first signal channel 100b, the second signal channel 200a, the third signal channel 200a', the fourth signal channel 200a", and the first through third time varying filters 300a, 300a', and 300a". Additional clock signals CLK2, CLK3, and CLK4, at least one which is different from first clock signal CLK1, are input into the different time varying filters 300a, 300a', and 300a". The additional clock signals may be generated, for example, based on a clock signal received from a source associated with the respective digital audio signal, or may be generated by another clock generator circuit outside the multi-channel audio signal converting device (e.g., a clock generator circuit included in a system on a chip on which the multi-channel audio signal converting device is housed).

The multi-channel audio signal converting device 10f illustrated in FIG. 2B includes the first through fourth signal channels 100b, 200b, 200a', and 200a" and the time-varying filters 300b, 300a', and 300a" respectively corresponding to the second through fourth signal channels 200b, 200a', and 200a".

When the first signal channel 100b includes the DAC 210, the second signal channel 200b includes the ADC 110, and the third and fourth signal channels 200a' and 200a" include the DAC 210, the first signal channel 100b may receive the digital audio signal DAS-IN1 and the first clock signal CLK1 and output the analog audio signal AAS-O1.

The first time-varying filter 300b may synchronize the digital audio signal DAS generated through sampling based on the first clock signal CLK1 with the second clock signal CLK2. The digital audio signal DAS received from the second signal channel 200b is resampled in synchronization with the second clock signal CLK2.

The second time-varying filter 300a' may synchronize the digital audio signal DAS-IN2 generated through sampling based on the third clock signal CLK3 with the first clock signal CLK1. A digital audio signal DAS-R1 generated through resampling in synchronization with the first clock signal CLK1 may be input to the third signal channel 200a' and then converted into an analog audio signal AAS-O2 by the DAC 210 included in the third signal channel 200a'.

The third time-varying filter 300a" may synchronize the digital audio signal DAS-IN3 generated through sampling based on the fourth clock signal CLK4 with the first clock signal CLK1. A digital audio signal DAS-R2 generated through resampling in synchronization with the first clock signal CLK1 may be input to the fourth signal channel 200a" and then converted into an analog audio signal AAS-O3 by the DAC 210 included in the fourth signal channel 200a".

In this example, the same first clock signal CLK1 is input into each of the first signal channel 100b, the second signal channel 200b, the third signal channel 200a', the fourth signal channel 200a", and the first through third time varying filters 300b, 300a', and 300a". Additional clock signals CLK2, CLK3, and CLK4, at least one which is different from first clock signal CLK1, are input into the different time varying filters 300b, 300a', and 300a". As a result of the different signal conversions, multiple audio signals can be processed and output at the same time. For example the different output signals may be output to different speakers (one may be output to wireless speakers while another may be output to speakers embedded in a DTV), so that the DTV outputs different audio signals received from different sources to different respective audio output devices.

The inventive concept is not restricted to those embodiments illustrated in FIGS. 1A through 2B. For instance, the number of signal channels may be variously changed apart from 2 and 4 that have been illustrated above and various combinations can be made depending on whether a signal channel includes a DAC or an ADC.

Figure 3:
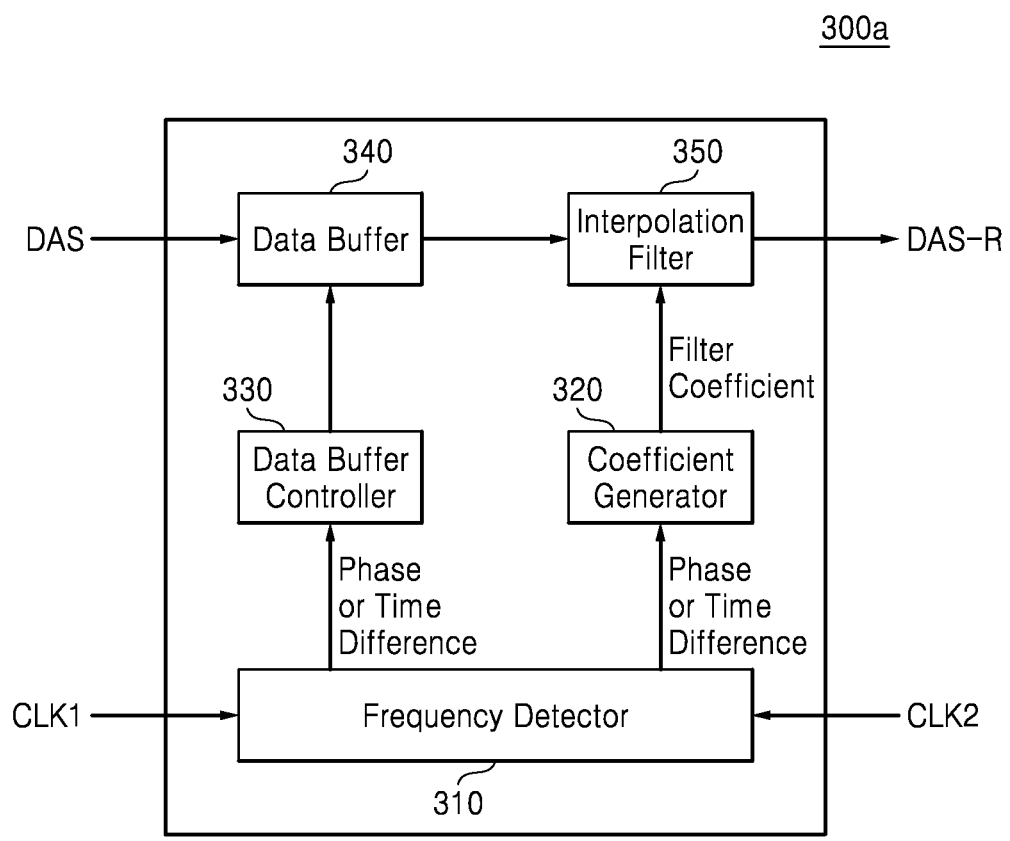
FIG. 3 is a block diagram of an exemplary time-varying filter according to some embodiments.
Figure 4:
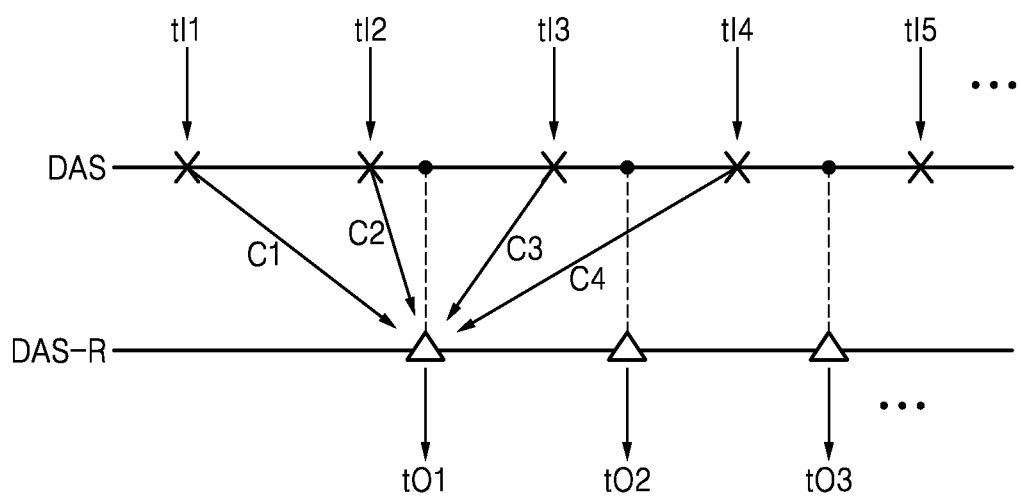
FIG. 4 is a diagram for explaining the operation of an exemplary time-varying filter according to some embodiments.

FIG. 3 is a block diagram of the time-varying filter 300a according to some exemplary embodiments. FIG. 4 is a diagram for explaining the operation of the time-varying filter 300a according to some exemplary embodiments.

The time-varying filter 300a may include, for example, a frequency detector 310, a coefficient generator 320, a data buffer controller 330, a data buffer 340, and an interpolation filter 350.

Referring to FIGS. 1A through 1D and FIG. 3, the frequency detector 310 included in the time-varying filter 300a receives the first clock signal CLK1 and the second clock signal CLK2.

The frequency detector 310 detects a phase difference or time difference between the two different clock signals, i.e., the first clock signal CLK1 and the second clock signal CLK2. The frequency detector 310 may be a circuit including one or more circuit elements, configured to perform the detecting.

In one embodiment, the frequency detector 310 is configured to calculate an average sampling rate with respect to the digital audio signal DAS input to the time-varying filter 300a in synchronization with the second clock signal CLK2 and is configured to calculate an average sampling rate with respect to the digital audio signal DAS-R output from the time-varying filter 300a in synchronization with the first clock signal CLK1.

The frequency detector 310 may accumulate average sampling rates for a predetermined period of time. For instance, the frequency detector 310 may accumulate average sampling frequencies with respect to frequencies or sampling periods of the digital audio signals DAS and DAS-R input to and output from the time-varying filter 300a at least several thousands of times to detect the phase difference and/or sampling time difference occurring between the digital audio signal DAS input to the time-varying filter 300a and the digital audio signal DAS-R output from the time-varying filter 300a due to the difference between the first clock signal CLK1 and the second clock signal CLK2.

Alternatively, the frequency detector 310 may sample (or count) the first clock signal CLK1 and the second clock signal CLK2 using a sampling clock signal having a higher frequency than the first and second clock signals CLK1 and CLK2.

As another alternative, the frequency detector 310 may divide the frequency of one clock signal (e.g., CLK1) between the first and second clock signals CLK1 and CLK2 by a multiple of an integer and sample (or count) a clock signal having the divided frequency using the other clock signal (e.g., CLK2) between the first and second clock signals CLK1 and CLK2 to calculate the difference (the phase difference or the time difference) between the first and second clock signals CLK1 and CLK2.

Referring to FIG. 4, it is assumed that the digital audio signal DAS synchronized with the second clock signal CLK2 is input to the time-varying filter 300a at time points tI1, tI2, tI3, tI4, and tI5 and the digital audio signal DAS-R resampled in synchronization with the first clock signal CLK1 is output from the time-varying filter 300a at time points tO1, tO2, and tO3.

In this case, the frequency detector 310 may calculate the difference between the time points tI2 and tO1, the difference between the time points tI3 and tO2, and the difference between the time points tI4 and tO3.

The coefficient generator 320 may generate a filter coefficient for the interpolation filter 350 using the sampling time difference and/or the sampling phase difference detected by the frequency detector 310. The coefficient generator 320 may be a circuit having one or more circuit elements, configured to perform the generating.

In one embodiment, the coefficient generator 320 may generate a filter coefficient for each of a plurality of samples forming the digital audio signal DAS input to the time-varying filter 300a based on a sampling time of each sample. For instance, when each of the samples is a signal having 256 clock cycles, a filter coefficient can be generated for each sample.

In one embodiment, the coefficient generator 320 transmits the filter coefficient generated for each sample to the interpolation filter 350.

In FIG. 4, reference characters C1, C2, C3 and C4 denote filter coefficients.

The data buffer controller 330 may control the data buffer 340 not to overflow based on the sampling time difference and/or the sampling phase difference detected by the frequency detector 310. For instance, the data buffer controller 330 may delay at least one sample based on a difference between an input rate of data into the data buffer 340 and an output rate of data from the data buffer 340. Both of the data buffer controller 330 and the data buffer 340 may be circuits having one or more circuit elements, configured to perform the buffering operations disclosed herein.

The data buffer 340 may temporarily store the digital audio signal DAS input to the time-varying filter 300a. As a result, the data buffer 340 may adjust a data rate according to the control of the data buffer controller 330 when data is congested due to the sampling time of input data and output data.

The interpolation filter 350 performs interpolation on the digital audio signal DAS input to the time-varying filter 300a using the filter coefficients (e.g., C1 through C4 in FIG. 4) generated by the coefficient generator 320. For instance, in one embodiment, the interpolation filter 350 multiplies each sample of the digital audio signal DAS input to the time-varying filter 300a by the corresponding filter coefficient and adds the multiplied values.

As a result, the interpolation filter 350 may output the digital audio signal DAS-R sampled in synchronization with the first clock signal CLK1. The interpolation filter 350 may be a circuit having one or more circuit elements, configured to perform the interpolation.

Referring to FIGS. 2A through 3, in certain embodiments, the time-varying filters 300b, 300a', and 300a'' included in the multi-channel audio signal converting device 10e or 10f have the same structure as the time-varying filter 300a. However, in certain embodiments, the time-varying filters 300b, 300a', and 300a'' receive different clock signals, i.e., the second clock signal CLK2, the third clock signal CLK3, and the fourth clock signal CLK4, respectively.

These clock signals may vary only slightly, and some of them may even be the same as others. Nonetheless, in certain embodiments, at least one of the second clock signal CLK2, the third clock signal CLK3, and the fourth clock signal CLK4 are different from each other and/or the first clock signal CLK1.

Figure 5A:
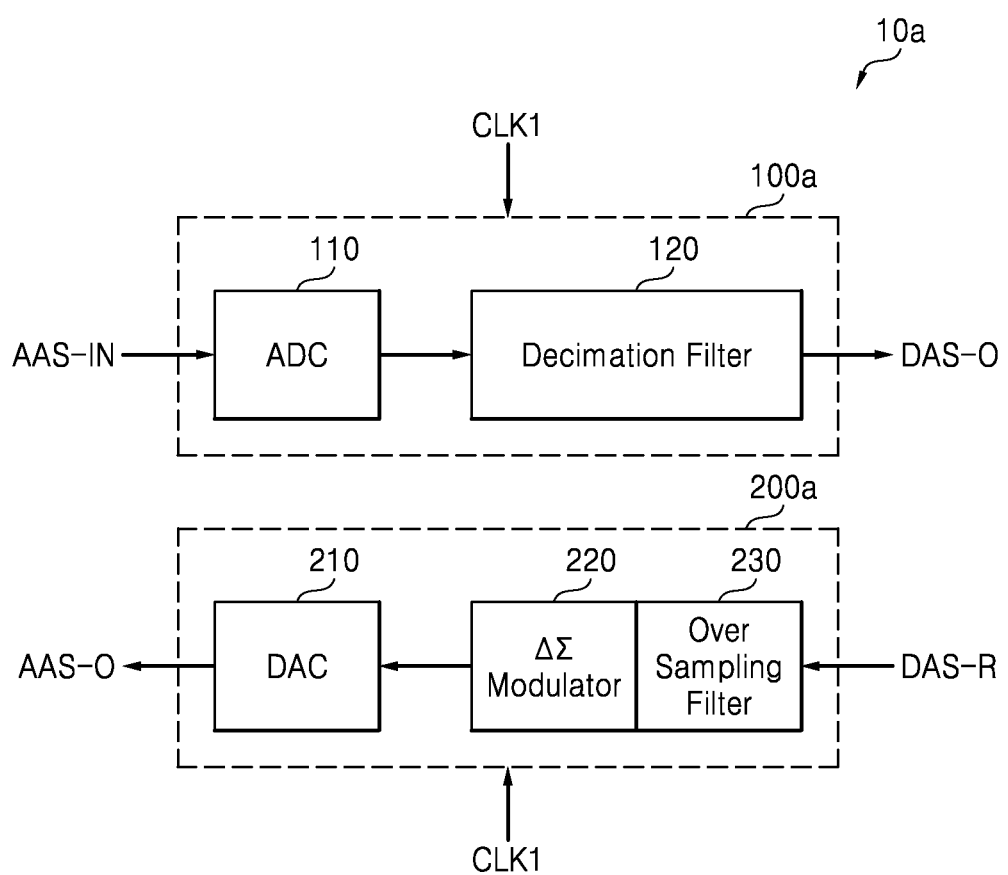
FIGS. 5A and 5B are schematic block diagrams of the structure of signal channels in an exemplary audio signal converting device according to some embodiments.
Figure 5B:
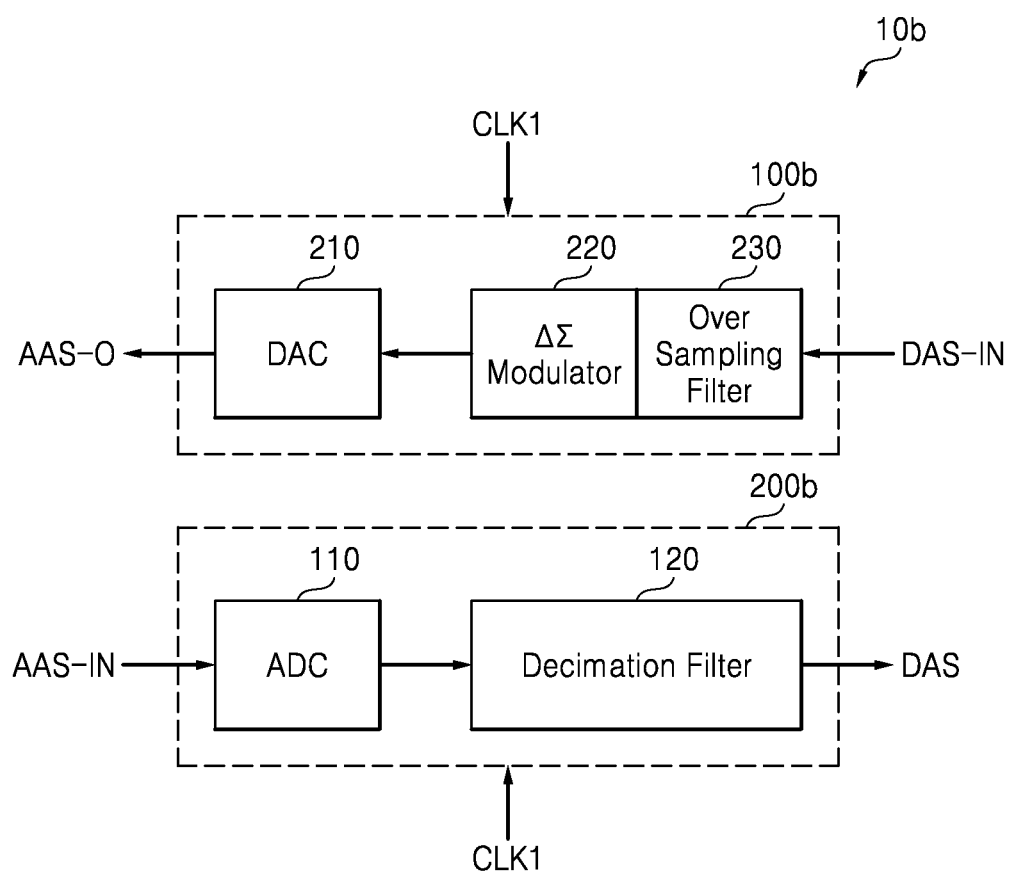

FIGS. 5A and 5B are schematic block diagram of the structure of exemplary signal channels in an audio signal converting device according to some embodiments.

Referring to FIG. 5A, in one embodiment, the first signal channel 100a includes the ADC 110 and a decimation filter 120. The second signal channel 200a may include the DAC 210, a delta-sigma modulator 220, and an over-sampling filter 230.

Referring to FIG. 5B, in one embodiment, the first signal channel 100b includes the DAC 210, the delta-sigma modulator 220, and the over-sampling filter 230. The second signal channel 200b includes the ADC 110 and the decimation filter 120.

As such, the signal channels 100a, 100b, 200a, and 200b may include the ADC 110 or the DAC 210 and may also include the decimation filter 120 when they include the ADC 110 or the delta-sigma modulator 220 and the over-sampling filter 230 when they include the DAC 210.

When the signal channels 100a, 100b, 200a, and 200b include the ADC 110, they may also include a delta-sigma modulator (not shown). When the signal channels 100a, 100b, 200a, and 200b include the ADC 110, they receive an analog audio signal. The analog audio signal is converted into a digital audio signal by the ADC 110. The decimation filter 120 may drop out one or more samples from the digital audio signal.

The digital audio signal that has passed through the decimation filter 120 may be output directly or may be resampled by the time-varying filter 300a before being output.

When the signal channels 100a, 100b, 200a, and 200b include the DAC 210, they receive a digital audio signal. The digital audio signal may be a signal that has been resampled by the time-varying filter 300*a* or a signal directly input to the signal channels 100*a*, 100*b*, 200*a*, and 200*b*.

The over-sampling filter 230 performs over-sampling on the digital audio signal. The delta-sigma modulator 220 performs a digital process on the over-sampled digital audio signal so that the digital audio signal is not affected by the changes in analog device characteristics.

Figure 6:
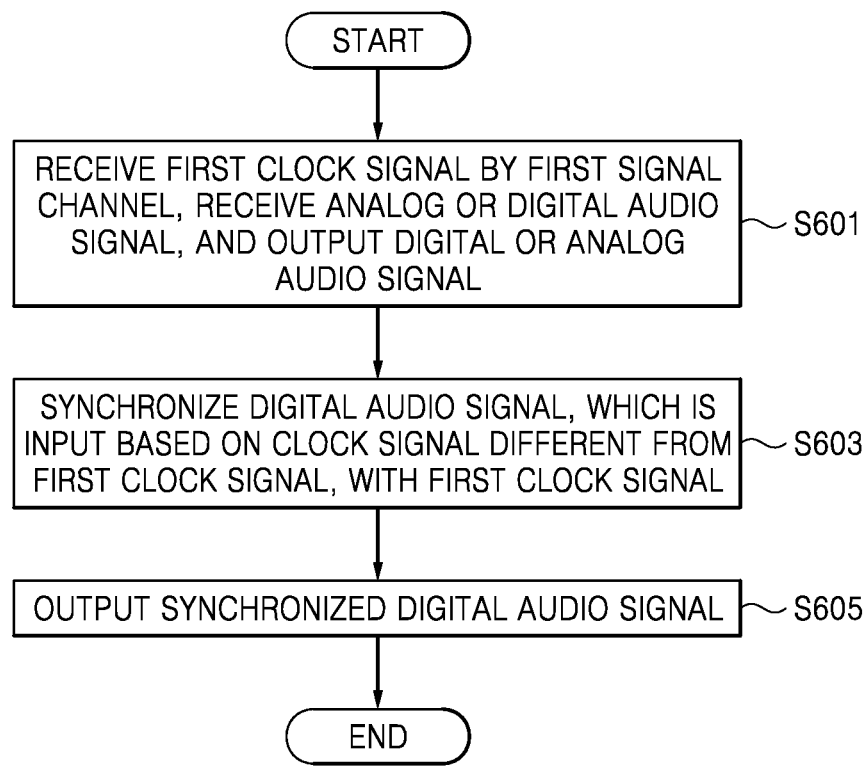
FIG. 6 is a schematic flowchart of an exemplary method of converting an audio signal according to some embodiments.

FIG. 6 is a schematic flowchart of an exemplary method of converting an audio signal according to some embodiments.

Referring to FIGS. 1A through 1D, in step S601, the first signal channel 100*a* or 100*b* receives the first clock signal CLK1, and receives either an analog or digital audio signal, and respectively outputs either a digital or analog audio signal. The time-varying filter 300*a* or 300*b* synchronizes a digital audio signal, which is received based on the second clock signal CLK2 different from the first clock signal CLK1, with the first clock signal CLK1 in operation S603. The digital audio signal synchronized with the first clock signal CLK1 may be directly output or may be converted into an analog audio signal before being output.

The time-varying filter 300*a* or 300*b* outputs the digital audio signal synchronized with the first clock signal CLK1 in operation S605.

Figure 7A:
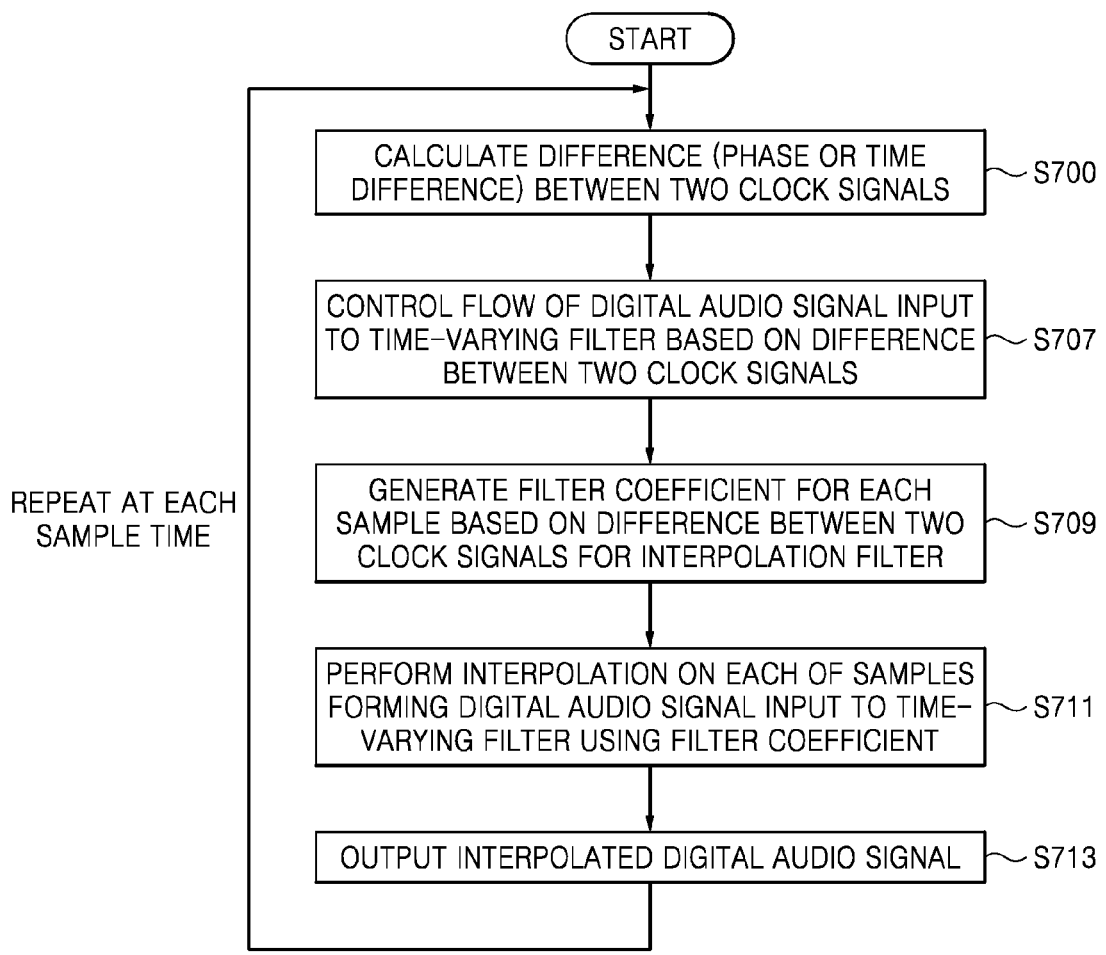
FIG. 7A is an exemplary flowchart of the operations of a time-varying filter in the method illustrated in FIG. 6 according to some embodiments.
Figure 7B:
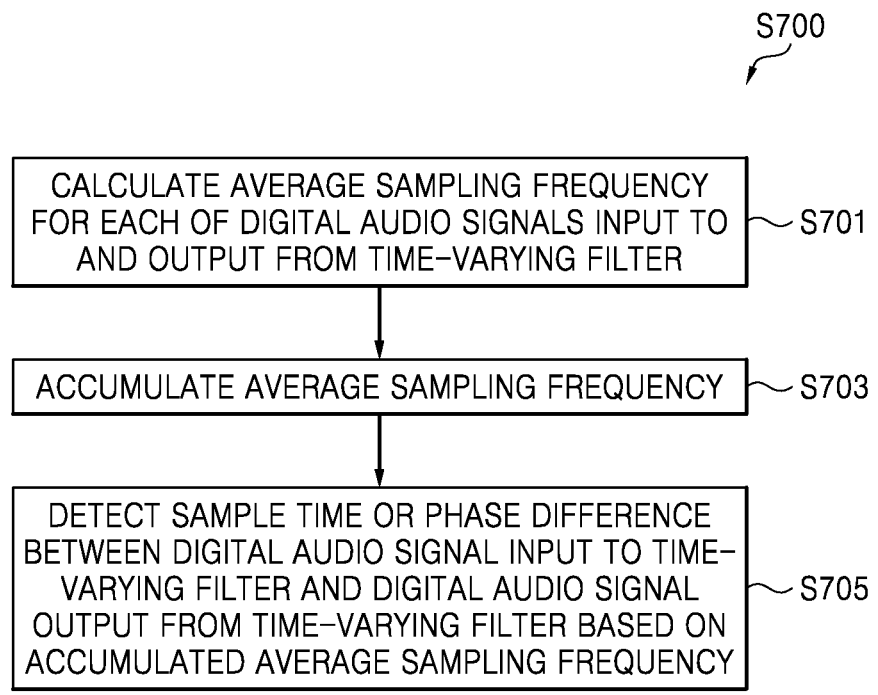
FIG. 7B is a detailed flowchart of an exemplary operation of calculating a difference between two clock signals illustrated in FIG. 7A.

FIG. 7A is a flowchart of exemplary operations of a time-varying filter in the example illustrated in FIG. 3 according to some embodiments. FIG. 7B is a detailed flowchart of an exemplary operation of calculating a difference between two clock signals illustrated in FIG. 7A.

Referring to FIG. 3 and FIG. 7A, the frequency detector 310 detects a phase or time difference between two different clock signals, i.e., the first clock signal CLK1 and the second clock signal CLK2 in operation S700.

In operation S700, operations S701, S703, and S705 illustrated in FIG. 7B may be performed.

In one embodiment, the frequency detector 310 included in the time-varying filter 300*a* calculates an average sampling frequency with respect to each of digital audio signals input to and output from the time-varying filter 300*a* in operation S701. The frequency detector 310 accumulates the average sampling frequency for a predetermined period of time in operation S703. The frequency detector 310 detects the sampling time or phase difference between the digital audio signal input to the time-varying filter 300*a* and the digital audio signal output from the time-varying filter 300*a* for each sample in operation S705.

The data buffer controller 330 controls the flow of a digital audio signal input to the data buffer 340 based on the sampling time or phase difference between the digital audio signal input to the time-varying filter 300*a* and the digital audio signal output from the time-varying filter 300*a* in operation S707. In detail, the data buffer controller 330 may control the amount of a signal input to the data buffer 340 and the amount of a signal output from the data buffer 340.

The coefficient generator 320 generates a filter coefficient for the interpolation filter 350 based on the sampling time or phase difference between the digital audio signal input to the time-varying filter 300*a* and the digital audio signal output from the time-varying filter 300*a* and transmits the filter coefficient to the interpolation filter 350 in operation S709. In detail, the coefficient generator 320 may measure a sampling time of each of a plurality of samples forming the digital audio signal input to the time-varying filter 300*a* and generate a filter coefficient for each sample.

The interpolation filter 350 receives the filter coefficient from the coefficient generator 320 and performs interpolation on each of a plurality of samples forming the digital audio signal that has been input to the time-varying filter 300*a* and output from the data buffer 340 using the filter coefficient in operation S711. The interpolation filter 350 may output a digital audio signal resampled through the interpolation in operation S713.

FIG. 8 is a flowchart of an exemplary method of converting an audio signal according to other embodiments.

Referring to FIGS. 1A and 1B and FIG. 8, the first signal channel 100*a* or 100*b* receives the first clock signal CLK1, and receives either an analog or digital audio signal, and respectively outputs either a digital or analog audio signal. Operations are different depending on whether the different signal channels include the DAC 210 or the ADC 110.

When it is determined that the second signal channel 200*a* or 200*b* includes the DAC 210 in operation S803, the time-varying filter 300*a* resamples a digital audio signal input and outputs a digital audio signal resampled to the second signal channel 200*a* in operation S805. As such, the time-varying filter 300*a* synchronizes the digital audio signal input in synchronization with the second clock signal CLK2 with the first clock signal CLK1 and outputs the digital audio signal synchronized with the first clock signal CLK1 to the second signal channel 200*a*. The second signal channel 200*a* converts the digital audio signal into an analog audio signal in operation S807.

When it is determined that the second signal channel 200*a* or 200*b* includes the ADC 110 in operation S803, the second signal channel 200*b* converts an analog audio signal input into a digital audio signal and outputs the digital audio signal to the time-varying filter 300*b* in operation S809.

The time-varying filter 300*b* resamples the digital audio signal in operation S811.

Referring to FIGS. 2A and 2B and FIG. 8, when there are a plurality of the signal channels 200*a* or 200*b*, 200*a*', and 200*a*'', the time-varying filters 300*a* or 300*b*, 300*a*', and 300*a*'' may respectively synchronize digital audio signals input based on different clock signals, respectively, with the first clock signal CLK1.

Figure 9:
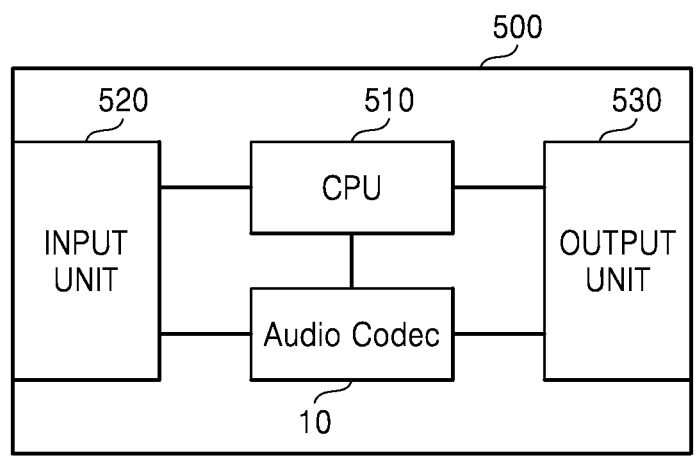
FIG. 9 is a schematic block diagram of an exemplary electronic system including a multi-channel audio signal converting device according to some embodiments.

FIG. 9 is a schematic block diagram of an electronic system 500 including a multi-channel audio signal converting device 10 according to some exemplary embodiments. The electronic system 500 includes the multi-channel audio signal converting device 10, a central processing unit 510, an input unit 520, and an output unit 530.

The multi-channel audio signal converting device 10 may be one of the multi-channel audio signal converting devices 10*a*, 10*b*, 10*c*, 10*d*, 10*e*, and 10*f* illustrated in FIGS. 1A through 2B and FIGS. 5A and 5B.

The CPU 510 controls the overall operation of the electronic system 500. The input unit 520 is a module for receiving an audio signal. The output unit 530 is a module for outputting an audio signal.

The CPU 510 may be, for example, one or more microprocessors. The input unit 520 may include, for example, various audio input lines for receiving various audio signals from various external sources, such as DVD players, personal computers (PCs), set-top boxes (STBs) a microphone and input modules for receiving wireless audio signals, etc. However, the inventive concept is not restricted thereto. The output unit 530 may include, for example, audio output lines for outputting various audio signals to various external devices, such as personal computers (PCs), a speaker, output modules for transmitting wireless audio signals, etc. However, the inventive concept is not restricted thereto.

The electronic system 500 may be any type of system that includes the multi-channel audio signal converting device 10. For instance, the electronic system 500 may be an audio system, a mobile device, or a DTV system. However, the inventive concept is not restricted to these examples.

In one embodiment, for example, in a DTV system, the inputs to the electronic system 500 are inputs from external sources, such as, for example, a DVD player, personal computer, set-top box, etc. The outputs from the electronic system 500 may include, for example, speakers (e.g., embedded in the TV), a wireless transmitter for transmitting an audio signal to a headphone or other wireless speaker, or other outputs to other audio devices. In one embodiment, each audio input signal received from a source device corresponds to an audio output signal transmitted to an output device. The multi-channel audio signal converting device 10 may be configured to process multiple of the input signals at the same time, in order to output the respective output signals. Due to the sampling conversions described herein, signal interference can be minimized.

Figure 10A:
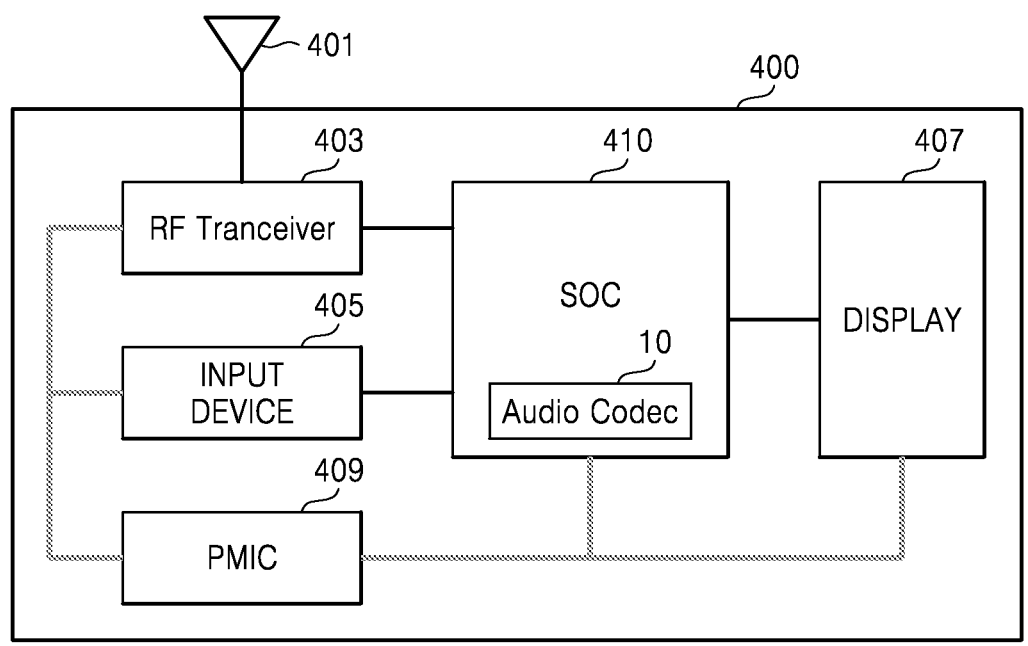
FIG. 10A is a schematic block diagram of an exemplary electronic system including a multi-channel audio signal converting device according to other embodiments.

FIG. 10A is a schematic block diagram of an electronic system 400 including the multi-channel audio signal converting device 10 according to other exemplary embodiments. The electronic system 400 includes a system on chip (SOC) 410, an antenna 401, a radio frequency (RF) transceiver 403, an input device 405, a display 407, and a power management integrated circuit (PMIC) 409. The SOC 410 may include the multi-channel audio signal converting device 10.

The multi-channel audio signal converting device 10 may be one of the multi-channel audio signal converting devices 10a, 10b, 10c, 10d, 10e, and 10f illustrated in FIGS. 1A through 2B and FIGS. 5A and 5B.

The RF transceiver 403 may transmit or receive radio signals through the antenna 401. The RF transceiver 403 may convert radio signals received through the antenna 401 into signals that can be processed by the SOC 410. The RF transceiver 403 may also have a modem function of performing modulation and demodulation.

Accordingly, the SOC 410 may process the signals output from the RF transceiver 403 and transmit the processed signals to the display 407. The RF transceiver 403 may also convert signals output from the SOC 410 into radio signals and output the radio signals to an external device through the antenna 401.

The input device 405 enables control signals for controlling the operation of the SOC 410 or data to be processed by the SOC 410 to be input to the electronic system 400. The input device 405 may be implemented by a pointing device such as a touch pad or a computer mouse, a keypad, or a keyboard, for example.

The PMIC 409 supplies electric power to the other elements 403, 405, 407, and 410.

The electronic system 400 may be, for example, a portable electronic device such as a mobile phone, a smart phone, a tablet personal computer (PC), or a personal digital assistant (PDA). The multi-channel audio signal converting device 10 may be configured to process multiple audio signals at the same time (e.g., a tablet PC may process streaming audio received from the Internet at the same time as processing audio tracks from a movie being played internally, or a smart phone may process the audio received from a caller and output to a speaker during a phone call at the same time as it processes audio received from a recipient at a microphone during the phone call).

Figure 10B:
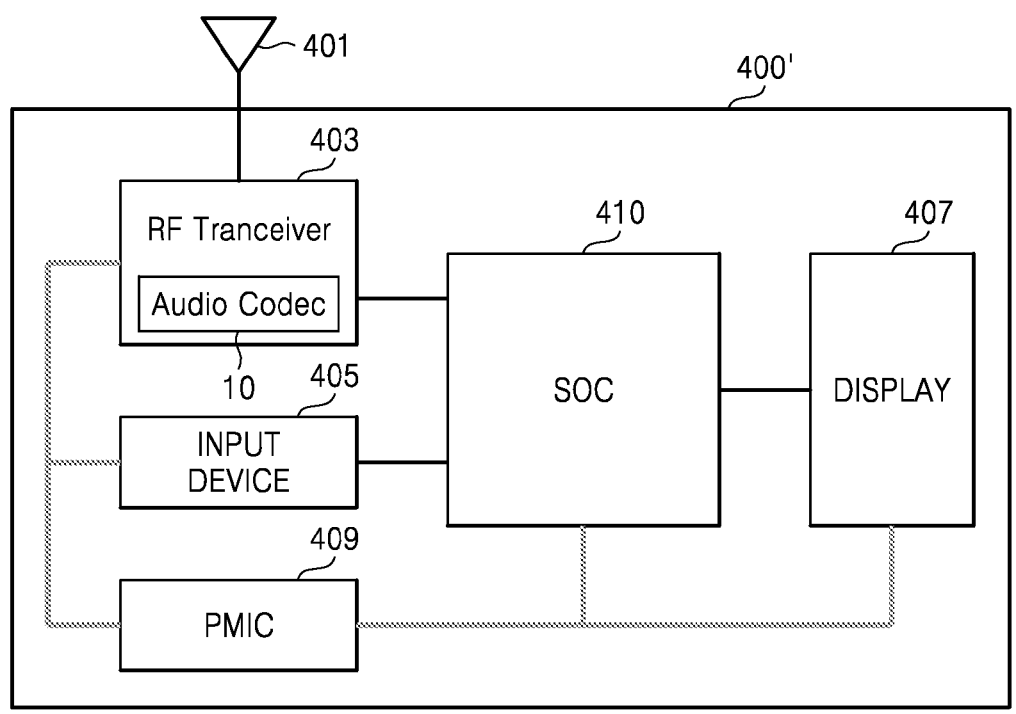
FIG. 10B is a schematic block diagram of an exemplary electronic system including a multi-channel audio signal converting device according to further embodiments.

FIG. 10B is a schematic block diagram of an electronic system 400' including the multi-channel audio signal converting device 10 according to further exemplary embodiments. The electronic system 400' illustrated in FIG. 10B is similar to the electronic system 400 illustrated in FIG. 10A. To avoid redundancy in the description, only differences therebetween will be described. While the electronic system 400 illustrated in FIG. 10A includes multi-channel audio signal converting device 10 in the SOC 410, the electronic system 400' illustrated in FIG. 10B includes the multi-channel audio signal converting device 10 in the RF transceiver 403.

Although not shown, the multi-channel audio signal converting device 10 may be implemented within the PMIC 407 in other embodiments. When the RF transceiver 403 and the SOC 410 are integrated into a single chip, the multi-channel audio signal converting device 10 may be implemented in the single chip.

Figure 11:
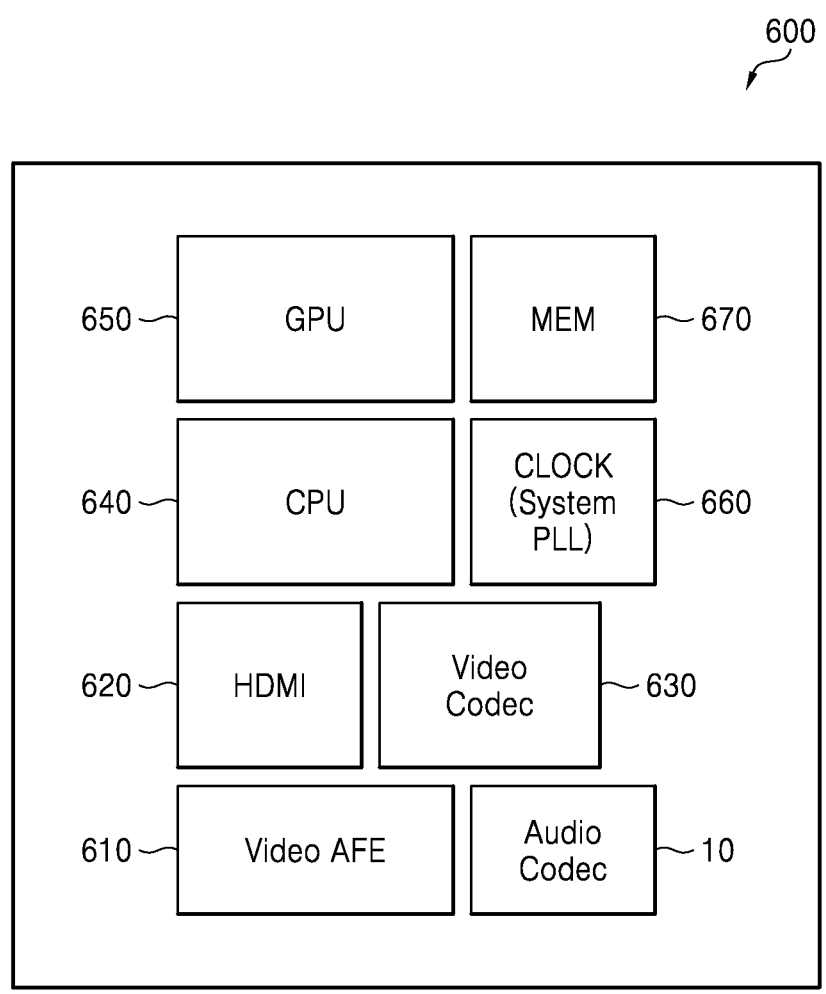
FIG. 11 is a schematic block diagram of an exemplary system on chip (SOC) according to some embodiments.

FIG. 11 is a schematic block diagram of a SOC 600 according to some exemplary embodiments. The SOC 600 may include, for example, the multi-channel audio signal converting device 10, a video analog front end (AFE) 610, a high definition multimedia interface (HDMI) 620, a video codec 630, a CPU 640, a graphics processing unit (GPU) 650, a clock 660, and a memory 670.

The multi-channel audio signal converting device 10 may be one of the multi-channel audio signal converting devices 10a, 10b, 10c, 10d, 10e, and 10f illustrated in FIGS. 1A through 2B and FIGS. 5A and 5B.

The video AFE 610 is a block for receiving a video signal. The video AFE 610 may include, for example, an RGB front end (not shown) for receiving and processing an RGB signal or a YPbPr signal, a composite video banking sync (CVBS) front end (not shown) for receiving and processing a SCART signal according to a video communication mode using a 21-pin connector or a CVBS signal, and a SIF/CH/IF front end (not shown) for receiving and processing a SIF/CH/IF signal. The SIF signal is a sound intermediate frequency signal, the CH signal is a DTV signal, and the IF signal is an analog video signal.

The HDMI 620 receives and processes HDMI signals.

The video codec 630 may demodulate or decode video signal received through the video AFE 610 and the HDMI 620.

The CPU 640 controls the overall operation of the SOC 600. The clock 660 may include a system phase-locked loop (PLL) and is a clock generation module that provides a clock signal necessary for the internal operation of the SOC 600.

The memory 670 may include an internal memory device (volatile or non-volatile memory) or a memory controller for controlling an external memory device.

Figure 12:
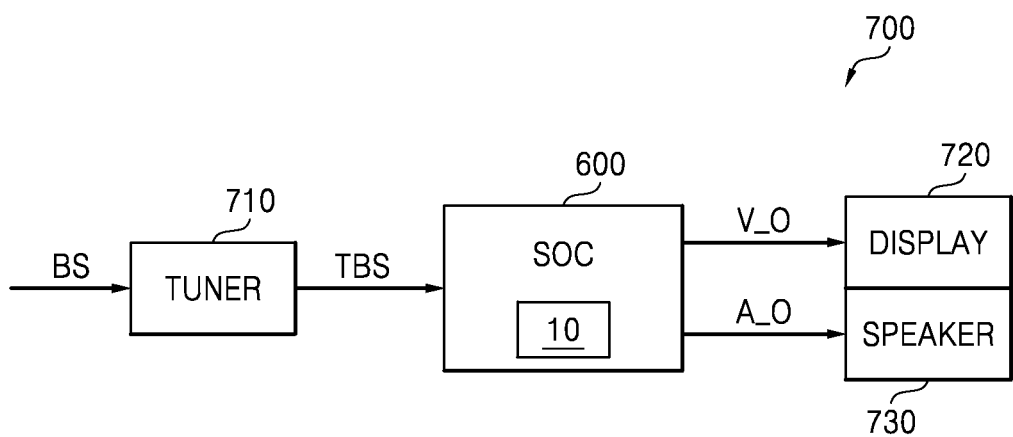
FIG. 12 is a schematic block diagram of an exemplary digital television (DTV) system according to some embodiments.

FIG. 12 is a schematic block diagram of a DTV system 700 according to some exemplary embodiments. The DTV system 700 may be implemented, for example, as a satellite DTV system, a cable DTV system, a handheld DTV system, or a terrestrial DTV system. The DTV system 700 includes a high-definition (HD) TV system. The handheld DTV system may be implemented, for example, as a mobile phone, a smart phone, a tablet PC, a car navigation system, a PDA, or a portable multimedia player (PMP). The DTV system 700 includes a tuner 710, the SOC 600, and an output unit.

The tuner 710 includes a circuit, a logic, and/or a code. The tuner 710 may acquire a broadcast signal BS and generate a single-ended sound intermediate frequency (SIF) signal having a carrier frequency of several MHz and/or differential TV broadcast signals.

The differential TV broadcast signals may include differential DTV broadcast signals, e.g., DTV video signals and DTV SIF signals. The differential TV broadcast signals may also include differential analog TV broadcast signals, e.g., analog video signals and analog SIF signals.

In some embodiments, the differential TV broadcast signals, i.e., the DTV video signals and the DTV SIF signals may be the signals that comply with a European DTV standard, i.e., a digital video broadcasting (DVB) family, such as DVB-satellite (DVB-S), DVB-terrestrial (DVB-T), DVB-cable (DVB-C), DVB-handheld (DVB-H), or DVB-satellite services to handhelds (DVB-SH).

In other embodiments, the differential TV broadcast signals, i.e., the DTV video signals and the DTV SIF signals may be the signals that comply with a North-American DTV standard, i.e., advance television system committee (ATSC) family, such as ATSC (terrestrial/cable) or ATSC-mobile/handheld (ATSC-MH).

In further embodiments, the differential TV broadcast signals, i.e., the DTV video signals and the DTV SIF signals may be the signals that comply with a Japanese and Latin-American DTV standard, i.e., integrated services digital broadcasting (ISDB), such as ISDB-S, ISDB-T, ISDB-C, or lseg (handheld). Here, lseg is a mobile terrestrial digital SIF/video and data broadcasting service in Japan, Chile, Brazil, Peru, and Argentina.

In other embodiments, the differential TV broadcast signals, i.e., the DTV video signals and the DTV SIF signals may be the signals that comply with International System for Digital Broadcast, Terrestrial, Brazilian version (ISDB-Tb), i.e., a DTV standard used in Brazil, Argentina, Chile, Peru, Venezuela, Bolivia, Ecuador, Costa Rica, and Uruguay.

In yet other embodiments, the differential TV broadcast signals, i.e., the DTV video signals and the DTV SIF signals may be the signals that comply with a Chinese DTV standard, i.e., China Digital Multimedia Broadcast-Terrestrial/Handheld (CDMB-T/H) or China Mobile Multimedia Broadcasting (CMMB).

In still other embodiments, the differential TV broadcast signals may be the signals that comply with a Korean DTV standard, i.e., Terrestrial-Digital Multimedia Broadcasting (T-DMB) or Satellite-DMB (S-DMB).

In further embodiments, the differential TV broadcast signals, i.e., the analog video signals and the analog SIF signals may be the signals that comply with National Television System Committee (NTSC), Phase Alternating Line (PAL), or Sequential Color with Memory (SECAM).

An output signal TBS of the tuner 710 is input to the SOC 600 and processed into signals V_O (video output) and A_O (audio output) suitable to the output unit.

The output unit may include, for example, a display 720 and a speaker 730. In certain embodiments, the display 720 and the speaker 730 may be integrated into a single body.

Although the tuner 710 is separated from the SOC 600 in the embodiments illustrated in FIG. 12, the tuner 710 may be implemented within the SOC 600 in other embodiments.

Although a SOC is described above, the various embodiments for the audio signal processing through multiple channels may also be implemented on a system-in-package device.

As described above, according to some embodiments, an asynchronous audio signal is resampled to synchronize all analog circuits, thereby eliminating interference between asynchronous clock signals.

In addition, even when different clock signals are used in a digital domain, the clock signals are synchronized with a single clock signal (i.e., a reference clock signal) using a time-varying filter, so that only a single clock signal is used in an analog domain (including a circuit converting an analog signal into a digital signal and a circuit converting a digital signal into an analog signal). As a result, interference occurring between multiple audio signal converting channels using asynchronous clock signals is eliminated.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of converting an audio signal in a multi-channel audio system, the method comprising:
performing at least one of analog-to-digital conversion and digital-to-analog conversion of a first audio signal using a first clock signal in a first signal channel;
synchronizing a second, digital audio signal synchronized with a second clock signal different from the first clock signal with the first clock signal by resampling the digital audio signal in synchronization with the first clock signal;
outputting the resampled digital audio signal to a second signal channel; and
performing digital-to-analog conversion of the resampled digital audio signal using the first clock signal in the second signal channel.

2. The method of claim 1, wherein the synchronizing comprises:
inputting the first clock signal to a first time-varying filter;
synchronizing a digital audio signal, which is input to the first time-varying filter in synchronization with the second clock signal, with the first clock signal; and
outputting the digital audio signal synchronized with the first clock signal to the second signal channel comprising a digital-to-analog converter.

3. The method of claim 2, wherein the digital audio signal input to the second signal channel is a result of resampling the digital audio signal input to the first time-varying filter, based on the first clock signal.

4. The method of claim 3, further comprising:
synchronizing, by a second time-varying filter, a digital audio signal, which has been synchronized with a third clock signal different from the first clock signal, with the first clock signal; and
converting, by a third signal channel, an output signal of the second time-varying filter into an analog audio signal using the first clock signal.

5. The method of claim 1, wherein the synchronizing comprises:
calculating a phase or time difference between the first clock signal and the second clock signal;
generating a filter coefficient for a time-varying filter based on the calculated difference; and
interpolating a digital audio signal input to the time-varying filter using the filter coefficient.

6. The method of claim 5, wherein the calculating the phase or time difference comprises calculating an average sampling frequency for each of the digital audio signal input to the time-varying filter and a digital audio signal output from the time-varying filter.

7. The method of claim 6, wherein the calculating the phase or time difference further comprises accumulating the average sampling frequency for a predetermined period of time.

8. The method of claim 7, wherein the calculating the phase or time difference further comprises detecting sampling time or phase difference between the digital audio signal input to the time-varying filter and the digital audio signal output from the time-varying filter based on the accumulated average sampling frequency.

9. The method of claim 5, wherein the generating the filter coefficient comprises measuring a sampling time of each of a plurality of samples forming the digital audio signal input to the time-varying filter and generating a filter coefficient for each sample.

10. The method of claim 5, wherein the calculating the phase or time difference comprises:
dividing a frequency of the second clock signal; and
sampling or counting a frequency-divided second clock signal with the first clock signal.

11. The method of claim 5, wherein the calculating the phase or time difference comprises:
dividing a frequency of the first clock signal and a frequency of the second clock signal; and
sampling or counting a frequency-divided first clock signal and a frequency-divided second clock signal with a sampling clock signal having a higher frequency than the first and second clock signals.

12. A multi-channel audio signal converting device comprising:
a first signal channel configured to perform at least one of analog-to-digital conversion and digital-to-analog conversion of a first audio signal using a first clock signal;
a first time-varying filter configured to synchronize a second, digital audio signal synchronized with a second clock signal different from the first clock signal with the first clock signal by resampling the digital audio signal in synchronization with the first clock signal and to output the resampled digital audio signal; and
a second signal channel configured to receive the resampled digital audio signal from the first time-varying filter and perform digital-to-analog conversion of the resampled digital audio signal using the first clock signal.

13. The multi-channel audio signal converting device of claim 12, wherein the first signal channel comprises a digital-to-analog converter;
wherein the first time-varying filter receives the first clock signal, the second clock signal, and the digital audio signal and synchronizes the digital audio signal with the first clock signal; and
wherein the second signal channel receives a digital audio signal from the first time-varying filter and converts the digital audio signal into an analog audio signal using the first clock signal.

14. The multi-channel audio signal converting device of claim 12, wherein the first time-varying filter comprises a frequency detector configured to calculate an average sampling frequency for each of the digital audio signal input to the first time-varying filter and a digital audio signal output from the first time-varying filter.

15. The multi-channel audio signal converting device of claim 14, wherein the frequency detector accumulates the average sampling frequency for a predetermined period of time and detects a sampling time or phase difference between the digital audio signal input to the first time-varying filter and the digital audio signal output from the first time-varying filter based on the accumulated average sampling frequency.

16. The multi-channel audio signal converting device of claim 15, wherein the first time-varying filter further comprises:
a data buffer configured to temporarily store the digital audio signal input to the first time-varying filter; and
a data buffer controller configured to control an amount of a digital audio signal output from the data buffer based on the sampling time or phase difference.

17. The multi-channel audio signal converting device of claim 15, wherein the first time-varying filter further comprises a coefficient generator configured to generate a filter coefficient based on the sampling time or phase difference.

18. The multi-channel audio signal converting device of claim 12, further comprising:
a second time-varying filter configured to receive the first clock signal, a third clock signal different from the first clock signal, and a digital audio signal and to synchronize the digital audio signal with the first clock signal; and
a third signal channel configured to receive a digital audio signal from the second time-varying filter and to convert the digital audio signal into an analog audio signal using the first clock signal.

19. The multi-channel audio signal converting device of claim 18, wherein the second signal channel and the third signal channel comprise:
an over-sampling filter configured to oversample a frequency of a digital audio signal input; and
a delta-sigma modulator configured to delta-sigma modulate the oversampled digital audio signal.

20. A method of converting, an audio signal, the methods comprising:
performing at least one of analog-to-digital conversion and digital-to-analog conversion of a first audio signal using a first clock signal in a first signal channel;
performing analog-to-digital conversion of a second audio signal using the first clock signal in a second signal channel; and synchronizing an output signal of the second signal channel with the second clock signal different from the first clock signal,
wherein the performing the conversion comprises converting an analog audio signal into a digital audio signal using the second signal channel comprising an analog-to-digital converter, and
wherein the synchronizing comprises:
inputting the first clock signal and the second clock signal to a first time-varying filter; and
the first time-varying filter synchronizing the digital audio signal, which has been synchronized with the first clock signal, with the second clock signal.

21. The method of claim 20, further comprising:
converting an analog audio signal into a digital audio signal using a third signal channel comprising an analog-to-digital converter, and
a second time-varying filter synchronizing the digital audio signal, which has been synchronized with the first clock signal, with a third clock signal different from the first clock signal.

22. The method of claim 20, further comprising:
a second time-varying filter synchronizing a digital audio signal, which has been synchronized with a third clock signal different from the first clock signal, with the first clock signal and outputting the digital audio signal to a third signal channel; and
the third signal channel converting the digital audio signal into an analog audio signal using the first clock signal.

* * * * *